(12) United States Patent
Moon et al.

(10) Patent No.: US 6,671,266 B1
(45) Date of Patent: Dec. 30, 2003

(54) DEVICE AND METHOD FOR CONTROLLING POWERS OF ORTHOGONAL CHANNEL AND QUASI-ORTHOGONAL CHANNEL IN CDMA COMMUNICATION SYSTEM

(75) Inventors: Hi-Chan Moon, Seoul (KR); Jae-Heung Yeom, Seoul (KR); Soon-Young Yoon, Seoul (KR); Jae-Min Ahn, Seoul (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/277,653

(22) Filed: Mar. 26, 1999

(30) Foreign Application Priority Data

Mar. 26, 1998 (KR) ............................................. 98-10616
Mar. 27, 1998 (KR) ............................................. 98-10838

(51) Int. Cl.[7] ........................... H04B 7/216; H04J 11/00
(52) U.S. Cl. ...................... 370/342; 370/320; 370/335; 370/206; 370/208; 370/209; 455/69
(58) Field of Search ........................ 370/320, 335, 370/342, 318, 336, 203, 206, 208, 209; 455/69, 522

(56) References Cited

U.S. PATENT DOCUMENTS

| | | | | |
|---|---|---|---|---|
| 4,384,364 A | * | 5/1983 | Henning | 455/60 |
| 5,748,687 A | * | 5/1998 | Ozulturk | 375/367 |
| 5,859,840 A | * | 1/1999 | Tiedemann, Jr. et al. | 370/335 |
| 6,028,894 A | * | 2/2000 | Oishi et al. | 375/227 |
| 6,215,778 B1 | * | 4/2001 | Lomp et al. | 370/335 |
| 6,256,290 B1 | * | 7/2001 | Ramesh | 370/204 |
| 6,269,088 B1 | * | 7/2001 | Masui et al. | 370/335 |
| 6,292,471 B1 | * | 9/2001 | Cao et al. | 370/252 |
| 6,324,395 B1 | * | 11/2001 | Khayrallah et al. | 455/406 |
| 6,332,006 B1 | * | 12/2001 | Rydbeck et al. | 375/262 |

* cited by examiner

*Primary Examiner*—Vivian Chin
*Assistant Examiner*—Eugene Yun
(74) *Attorney, Agent, or Firm*—Dilworth & Barrese, LLP (57) ABSTRACT

A power control device for a CDMA communication system using different kinds of spreading codes. In the power control device for a base station device, a first channel generator generates a first channel signal by spreading first input data with an orthogonal code and a second channel generator generates a second channel signal by spreading second input data with a quasi-orthogonal code. The second channel signal has a gain higher than that of the first channel signal. A first gain controller controls power of the first channel signal and a second gain controller controls power of the second channel signal. An adder adds the first channel signal to the second channel signal, and a spreader spreads a signal output from the adder with a pseudo-random noise (PN) code. The base station transmits a response request message to a mobile station via the second channel, and retransmits the response request message after increasing a transmission power of the second channel when a response message is not received from the mobile station.

43 Claims, 7 Drawing Sheets

DEVICE AND METHOD FOR CONTROLLING POWERS OF ORTHOGONAL CHANNEL AND QUASI-ORTHOGONAL CHANNEL IN CDMA COMMUNICATION SYSTEM

CLAIM OF PRIORITY

This application makes reference to, incorporates the same herein, and claims all benefits accruing under 35 U.S.C. §119 from an application entitled DEVICE AND METHOD FOR CONTROLLING POWER OF ORTHOGONAL CHANNEL AND QUASI-ORTHOGONAL CHANNEL IN CDMA COMMUNICATION SYSTEM earlier filed in the Korean Industrial Property Office on Mar. 26, 1998, and there duly assigned Serial No. 98-10616.

BACKGROUND OF THE INVENTION

1. Field of the Invention

The present invention relates to a power control device and method for a CDMA communication system, and in particular, to a device and method for controlling powers of channels using orthogonal codes and quasi-orthogonal codes for spreading codes.

2. Description of the Related Art

In a forward link of an IS-95 code division multiple access (CDMA) communication system, a single family of orthogonal codes are used for the respective channels as spreading codes for channel separation. A mobile station despreads received signals using orthogonal codes (or Walsh codes) assigned by a base station. Although signals received at the mobile station may include signals that the base station has directed to other mobile stations, the mobile station can effectively disregard the signals directed to other mobile stations by despreading the received signals using a unique orthogonal code assigned to itself. In addition, for channel separation, different orthogonal codes are assigned to the respective channels, so that there is almost no receiving strength difference among the channels.

However, in the case where quasi-orthogonal codes, are used for the CDMA forward link channelization spreading code, the channels which are spread with different kinds of spreading codes (i.e., the quasi-orthogonal code) may be assigned to the forward link spreading code in the base station. For example, the orthogonal and quasi-orthogonal codes may refer to a different type of the orthogonal codes and non-orthogonal codes besides the quasi-orthogonal codes. For more details about the quasi-orthogonal codes, see Korean patent application No. 46402/1997 filed by the applicant of the invention. In the present invention, quasi-orthogonal codes may be generated by other means in addition to that described by the embodiments of the present invention. That is, the quasi-orthogonal codes are codes satisfying three conditions: 1) a condition of Walsh codes and a full length correlation; 2) Walsh code and partial correlation; and 3) full length correlation between quasi-orthogonal codes. In the case where an orthogonal code is not received above a constant level in the base station, at least one channel among channels assigning to the mobile station assigns a reference ortho-code, and other channels assign the ortho-code, thereby to distinguish the channels.

In case where the orthogonal code does not rise above a predetermined threshold in the base station, at least one channel among those channels assigned to the mobile station is assigned a reference ortho-code, and the other channels are assigned ortho-codes, to distinguish the respective channels.

The mobile station then acquires channel information transmitted from the base station by despreading received signals with an orthogonal code assigned to itself and also acquires channel information by despreading the received signals with a quasi-orthogonal code assigned to itself.

The orthogonal codes which are assigned to the mobile station and used in despreading have a high orthogonality with one another, so that there is virtually no interference from other forward channels. By contrast, the quasi-orthogonal codes which are assigned to the mobile station, and used in despreading have a relatively lower orthogonality with those assigned to other forward channels. Accordingly, interference among the channels despread with the quasi-orthogonal codes is higher than that among the channels despread with the orthogonal codes. The mobile station measures a signal-to-interference ratio (SIR) and requests the base station to increase the signal power when the measured channel performance is low. Despreading with the orthogonal code channel at the mobile station results in a higher SIR, whereas despreading with the quasi-orthogonal code channel results in a lower SIR. Therefore, a problem may arise if the power control is generally performed on all channels on the basis of the SIR of a specific code channel. Accordingly, there is a need for an improved power control method whenever a base station spreads signals using orthogonal and quasi-orthogonal codes.

SUMMARY OF THE INVENTION

According to the present invention, there is provided an apparatus and method for controlling the power of channels using orthogonal spreading codes and quasi-orthogonal spreading codes.

It is therefore an object of the present invention to provide a device and method for separately controlling the transmitting the power of channels in a CDMA communication system using orthogonal and quasi-orthogonal codes.

It is another object of the present invention to provide a device and method for controlling transmitting the power of channels by separating channel signals spread with orthogonal codes and quasi-orthogonal codes and measuring signal-to-interference ratios (SIRs) of the respective coded channel signals in a CDMA communication system.

In one aspect of the present invention a device and method is provided for controlling transmitting the power of channels spread with orthogonal codes and quasi-orthogonal codes spread with a single power control command in a CDMA communication system.

In another aspect of the present invention a device and method is provided for controlling a transmitting power ratio between channels in a CDMA communication system using orthogonal and quasi-orthogonal codes, in which a base station transmits a message to a mobile station according to a pre-set power ratio and determines whether the mobile station responds to the transmitted message within a pre-defined time.

In another aspect of the present invention a device and method is provided for controlling a transmitting power ratio between channels in a CDMA communication system using orthogonal and quasi-orthogonal codes, in which a mobile station sends a response request message to a base station, and the base station sends an acknowledge message and determines whether the same message is repeatedly received from the mobile station, to control the power ratio between the channels.

In another aspect of the present invention to provide a device and method for controlling a power ratio between channels according to the errors generated while decoding a channel spread with a quasi-orthogonal code at a mobile station.

BRIEF DESCRIPTION OF THE DRAWINGS

The above and other objects, features and advantages of the present invention will become more apparent from the following detailed description when taken in conjunction with the accompanying drawings in which like reference numerals indicate like parts. In the drawings.

DETAILED DESCRIPTION OF THE PREFERRED EMBODIMENT

A preferred embodiment of the present invention will be described hereinbelow with reference to the accompanying drawings. In the following description, well known functions or constructions are not described in detail since they would obscure the invention in unnecessary detail.

In order for a mobile station to attain the same signal-to-interference ratio (SIR) for the two channel signals despread with two orthogonal and quasi-orthogonal codes, the base station should preferably allocate the higher power to the channels spread with the quasi-orthogonal codes, as compared with the channels spread with the orthogonal codes. In addition, the power of the channels spread with the orthogonal codes should be separately controlled from the power of the channels spread with the quasi-orthogonal codes.

It should be noted that the following embodiments of the present invention use two kinds of spreading codes, i.e., orthogonal codes and quasi-orthogonal codes. However, the invention is equally applicable in the case where three or more orthogonal and quasi-orthogonal codes are used when a base station transmits more than three code channels.

First Embodiment

Figure 1:
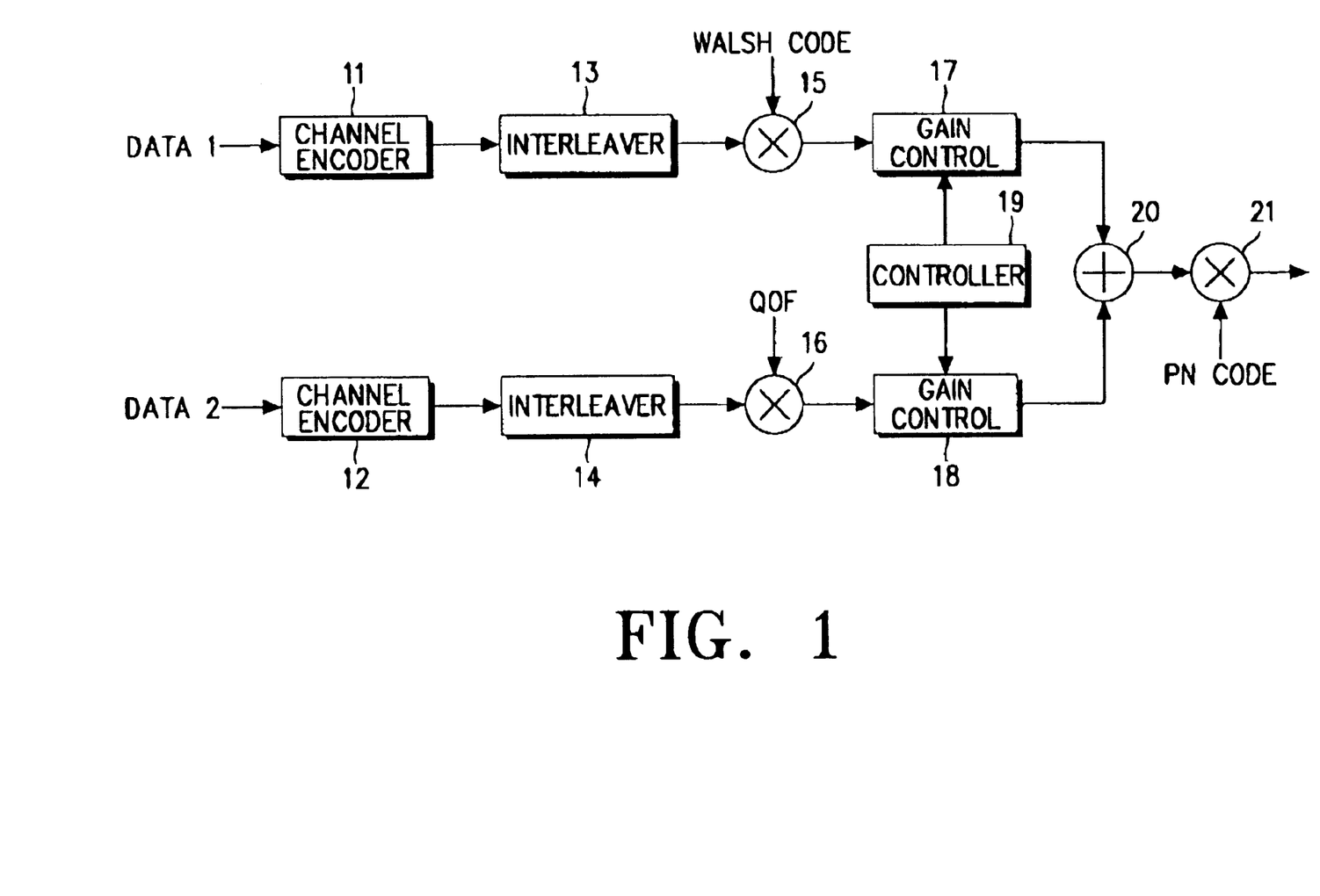
FIG. 1 is a block diagram illustrating a base station comprising multiple channel transmitters using orthogonal codes and quasi-orthogonal codes in a CDMA communication system, according to an embodiment of the present invention.

FIG. 1 is a block diagram of a base station channel transmission device 10 which transmits channel signals spread with two kinds of spreading codes (e.g., orthogonal codes and quasi-orthogonal codes) to a mobile station.

In FIG. 1, the channel transmission device 10 comprises channel encoders 11 and 12 for encoding corresponding channels, interleavers 13 and 14 for interleaving the encoded data according to a predefined rule. The channel transmitter device 10 further comprises a first spreader 15 for spreading an output of interleaver 13 with an orthogonal code (i.e., Walsh code), and a second spreader 16 for spreading an output of interleaver 14 with a quasi-orthogonal code $Q_{OF}$. Gain controllers 17 and 18 are provided for controlling power gains of the respective channels. A controller 19 coupled to the gain controllers 17 and 18 is shown for controlling respective channel power gains of the forward link according to a power control command received from the mobile station via the reverse link. An adder 20 is coupled to the gain controller 19 output for adding the signals. The output of the adder 20 is supplied to a spreader 21 for spreading the added signal with a pseudo-random noise (PN) code.

In operation, the first encoder 11 encodes input channel data DATA1 and the second encoder 12 encodes input channel data DATA2. The first and second interleavers 13 and 14 interleave the encoded data output from the respective channel encoders 11 and 12. The multiplier 15, (i.e., spreader) multiplies an output of the interleaver 13 by an orthogonal code (e.g., Walsh) to spread the output of the interleaver 13, and the multiplier 16, (i.e., spreader) multiplies an output of the interleaver 14 by a quasi-orthogonal code to spread the output of the interleaver 14.

The controller 19 generates a gain control signal to be supplied to the gain controllers 17 and 18 according to a power control command received from the reverse link. The first gain controller 17 receives a first channel signal, output from the multiplier 15 and controls a gain of the first channel signal according to the gain control signal provided from the controller 19. The second gain controller 18 receives the second channel signal, output from the multiplier 16 and controls a gain of the second channel signal according to the gain control signal provided from the controller 19. Thereafter, the adder 20 adds the channel signals being spread with the a combination of orthogonal and quasi-orthogonal codes, and the multiplier 21, (i.e., spreader), multiplies an output of the adder 20 by the PN code for base station identification. In this manner, the channel transmission device of FIG. 1 spreads the respective channel signals with the orthogonal code and the quasi-orthogonal code. In FIG. 1, it is assumed that the first channel spread with the orthogonal code is a forward fundamental channel and the second channel spread with the quasi-orthogonal code is a forward dedicated control channel. In the IS-95 A, B standard and the IS-2000 standard, a fundamental channel is a channel utilized mainly for voice service, and the forward dedicated control channel is a channel mainly for control messages.

Second Embodiment

Figure 2:
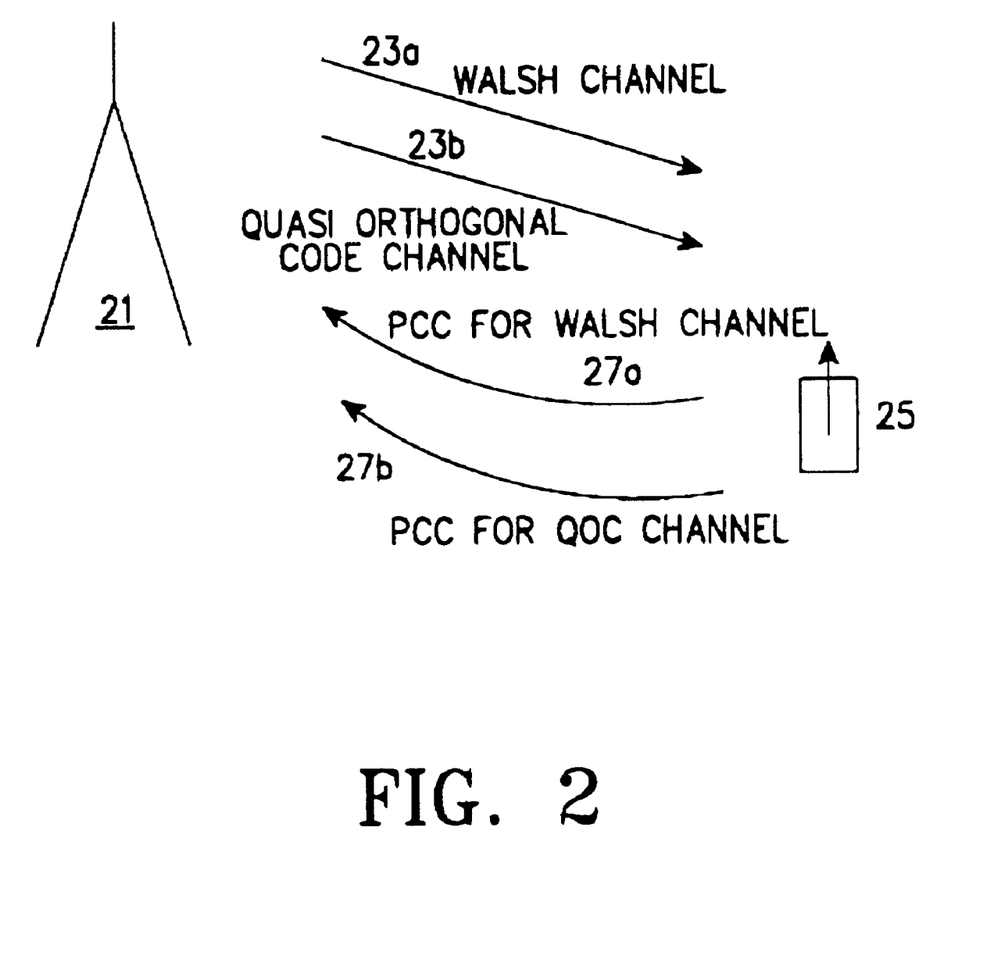
FIG. 2 is a diagram illustrating how power control is performed on a plurality of communication channels, each using a different kind of spreading code in a CDMA communication system according to an embodiment of the present invention.
Figure 3:
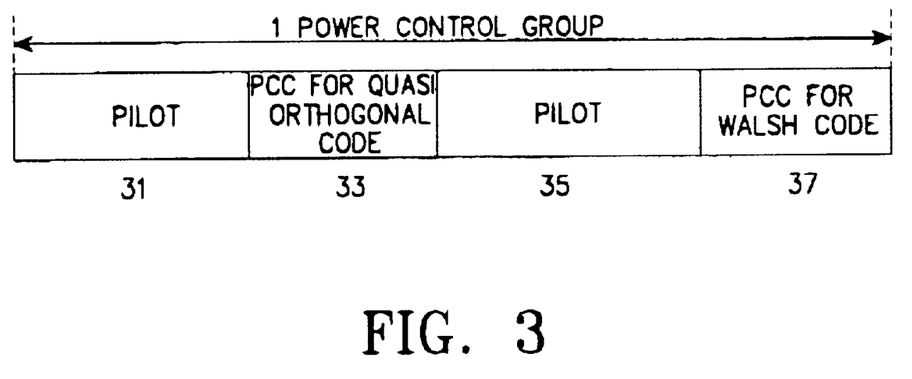
FIG. 3 is a diagram illustrating the structure of a power control group for separately controlling the power in a plurality of channels using orthogonal codes and quasi-orthogonal codes according to the present invention.

FIGS. 2 and 3 illustrate a second embodiment of the present invention. Reference will be made initially to FIG. 2 which is a diagram illustrating how power control is performed on two (2) communication channels, each using a different spreading code.

In FIG. 2, a mobile station 25 simultaneously receives two (2) channel signals from a channel transmission device of a base station 21, one spread with an orthogonal code and the other spread with a quasi-orthogonal code. The mobile station 25 despreads the respective channel signals and sends power control commands (PCC) to the base station 21 according to their respective SIRs. In particular, the base station 21 sends the mobile station 25 a channel spread with an orthogonal code (i.e., Walsh channel 23a) and a channel spread with a quasi-orthogonal code (i.e., quasi-orthogonal code channel 23b). Upon receiving the channel signals, the mobile station 25 then estimates the SIRs for the respective channel signals received from the base station 21, and sends to the base station 21 the power control command 27a for the Walsh channel and the power control command 27b for the quasi-orthogonal channel according to the estimated SIRs. Here, the power control commands 27a and 27b for the Walsh channel and the quasi-orthogonal channel are transmitted via a power control group on the reverse link pilot channel shown in FIG. 3.

FIG. 3 illustrates the structure of a power control group that the mobile station sends to the base station. As shown in FIG. 3, pilot symbols and power control commands are alternately arranged. In FIG. 3, reference numerals 31 and 35 denote the pilot symbols, reference numeral 33 denotes the power control command for the channel spread with the quasi-orthogonal code (i.e., quasi-orthogonal channel), and reference numeral 37 denotes the power control command for the channel spread with the orthogonal code (i.e., Walsh channel). In accordance with the teachings of the present invention, one power control group requires a power control command for the Walsh (i.e., orthogonal code) channel and a power control command for the quasi-orthogonal code channel. Further, to obtain a high SIR in each channel, the power control commands for the respective channels should be transmitted between the mobile station and base station with minimum delay.

1. Reducing the Number of Power Control Commands

A second aspect of the present invention applicable to all embodiment is directed to a method for reducing the number of power control commands for the channels in a CDMA communication system using orthogonal codes and quasi-orthogonal codes. In each of the exemplary embodiments of the invention, an orthogonal code and a quasi-orthogonal code are used as spreading codes. In addition, for brevity, a channel spread with the orthogonal code will hereinafter be referred to as orthogonal (or Walsh) channel and a channel spread with the quasi-orthogonal code a quasi-orthogonal channel.

It is assumed that a base station assigns orthogonal codes when unused orthogonal codes are available for forward link channel spreading and reverse link channel despreading, and quasi-orthogonal codes to the remaining unassigned forward link channels when a predefined number of unused orthogonal codes are not available. As is well-known in the art, interference among the channels using the orthogonal codes is lower than interference among the channel using the quasi-orthogonal codes. Therefore, it is necessary to increase the transmission power of channels using the quasi-orthogonal code to be higher than those channels using the orthogonal code, in order for the two channels to have the same signal-to-noise ratio (SIR) at the receiver. That is, the base station initially sets a power ratio between the two channels so that the channel spread with the quasi-orthogonal code is assigned a higher power as compared with the channel spread with the orthogonal code. Here, the mobile station measures the SIR for a reference channel despread with the orthogonal code, and sends the base station a power-up command when the measured value is lower than a first threshold value and a power-down command when the measured value is higher than a second threshold value. Upon receiving the power control commands, the base station then increases or decreases the transmission powers of the channels in accordance with a received power control command bit so that the transmission power ratio of the channel spread with the orthogonal code and the channel spread with the quasi-orthogonal code is maintained.

2. Fast Power Control

In accordance with a third aspect of the present invention applicable to all described embodiments, to efficiently cope with the SIR, power control for the channel spread with the orthogonal code could be performed fast. Furthermore, the power ratio between the orthogonal channel and the quasi-orthogonal channel of the base station should be varied according to the channel environment. In the above case, the power ratio is re-set by controlling the transmission power of the channel spread with the quasi-orthogonal code according to a receiving state of the quasi-orthogonal channel.

3. Message Exchange

In accordance with the third aspect of the present invention, a transmission device for the base station has the same structure as that shown in FIG. 1. However, a controller 19 of FIG. 1 controls the transmission power of the respective channels for the forward link according to an information signal (e.g., a power control command, a response (or ACK) message and a power ratio change command) received from the reverse link, and re-sets the power ratio between the channels upon detecting the change in the power ratio between the channels.

Third Embodiment

The present invention is directed to a method for using a single power control command to independently control the transmission powers of channels spread with of orthogonal codes and quasi-orthogonal codes. A third embodiment will be described below in the context of several exemplary methods for using a single power control command to reset the power ratio will be described below.

1. First Exemplary Method of the Third Embodiment

In a first exemplary method of the third embodiment, the mobile station re-sets the power ratio using only the SIR of the quasi-orthogonal channel. The mobile station measures an SIR of the orthogonal channel and compares the measured SIR with a threshold value so as to quickly transmit the power control bit via the reverse link. Subsequent to transmitting the power control bit, the mobile station measures an SIR of the quasi-orthogonal channel for a specified long time, as compared with the time taken to measure the orthogonal channel, and averages the measured SIR of the quasi-orthogonal channel. Here, the SIR is averaged for a predetermined long time interval. The time interval for measuring and averaging the SIR of the quasi-orthogonal channel is extended beyond that required to measure the SIR of the orthogonal channel, because only the averaged quasi-orthogonal SIR is used to reset the power ratio of the base station. When the measured SIR value of the quasi-orthogonal channel is lower than a first threshold value, the mobile station sends a power-up command for the quasi-orthogonal channel to the base station. Otherwise, when the measured SIR value of the quasi-orthogonal channel is higher than a second threshold value, the mobile station sends a power-down command for the quasi-orthogonal channel to the base station. That is, the mobile station sends a power ratio change command on a message frame to the base station via the reverse control channel, and the base station controls the transmission powers of the orthogonal channel and the quasi-orthogonal channel according to the power ratio change command as determined solely by the measured SIR of the quasi-orthogonal channel.

It should be further noted that while the mobile station sends a control message carrying the power ratio change message command to the base station, the mobile station may send a different type of message capable of controlling power of the forward link channels. For example, it is also possible to enable the base station to determine whether to change the power ratio, by sending the message including the SIRs of the quasi-orthogonal channel and the orthogonal channel.

Fourth Embodiment

Furthermore, as briefly described above, the mobile station compares the SIR of the quasi-orthogonal channel with two different threshold values, to determine a proper control message to send to the base station for controlling the power ratio. To compensate for property changes of a frame error rate (FER) and the SIR according to the channel environment, it is also possible to transmit a message capable of controlling a power ratio among the forward link channels by comparing the SIRs of the orthogonal channel and the quasi-orthogonal channel with the two threshold values.

As described above, since the method of the present invention quickly calculates only the SIR of the reference channel, only one power control command is required in the one power control group of FIG. 3. Therefore, as compared with the first embodiment where the mobile station sends the two power control commands by measuring the respective SIRs for the channels spread with the different kinds of orthogonal codes, it is possible to produce the power control command with reduced throughput since only the SIR of the reference channel is used for faster power control. In addition, since the invention requires only one power control command, the capacity of the reverse link is increased.

The present invention can measure the SIR of the quasi-orthogonal channel periodically or non-periodically. For example, in the case where the procedure is periodically performed, the control message is transmitted by comparing the SIR of the quasi-orthogonal channel at predefined periods. On the other hand, in the case where the procedure is performed non-periodically, the control message is transmitted only when the SIR of the quasi-orthogonal channel is within a specific range as determined by the two threshold values described above. In the former case, a message is continuously transmitted via the reverse link even when there is no need to control the power ratio, thereby wasting the capacity of the reverse link. However, the latter case (i.e., non-periodic) is advantageous in that the base station can monitor the transmission power efficiency of the forward link.

2. Second Exemplary Method of the Third Embodiment

The second exemplary method operates in an almost identical manner to that described in the first exemplary method, however, with the important distinction being that the power ratio is re-set not by using the SIR of the quasi-orthogonal channel, but rather by examining a performance metric of the quasi-orthogonal channel. In accordance with the second exemplary method, the base station transmits a response request message via the quasi-orthogonal channel to the mobile station and controls the power ratio of the forward link according to whether a response to the message is received or not from the mobile station. That is, the base station transmits the response (or ACK) request message to the mobile station via the quasi-orthogonal channel using a previously set power ratio. Thereafter, when there is no response from the mobile station after a lapse of a predefined time, the base station re-sets the power control ratio by increasing the power of the quasi-orthogonal channel by a specified level, $\Delta Pu$. Otherwise, when there is a response from the mobile station within the predefined time, the base station either maintains the present power of the quasi-orthogonal channel or re-sets the power ratio by decreasing the power of the quasi-orthogonal channel by the specified level $\Delta Pu$. In this case a mobile station's response message could include SIR of the quasi-orthogonal channel.

3. Third Exemplary Method of the Third Embodiment

Next, in a third exemplary method of the second embodiment the power state of the quasi-orthogonal channel is divided into two cases.

In a first case, the mobile station receives a quasi-orthogonal channel signal at a higher or comparable level to a threshold value of the SIR, because of the high power of the quasi-orthogonal channel for the forward link. In this case, the mobile station sends a response request message to the base station, and the base station sends an acknowledge (ACK) message to the mobile station upon receiving the message without an error. Here, the base station sends the ACK message via the quasi-orthogonal channel so that the mobile station can receive the ACK message without error. If the acknowledge message is not transmitted from the mobile station within a predefined time, the base station re-sets the power ratio by decreasing the power of only the quasi-orthogonal channel on the judgement that the power of the quasi-orthogonal channel is a good state.

In a second case, the mobile station receives the quasi-orthogonal channel signal at a much lower level than the threshold level of the SIR, because of the low power of the quasi-orthogonal channel for the forward link. The mobile station requests the ACK message by sending the response request message to the base station. Here, even though the base station sends the ACK message via the quasi-orthogonal channel, the mobile station may fail to receive the ACK message correctly due to the low power of the quasi-orthogonal channel. Accordingly, the mobile station retransmits the message to the base station to request retransmission of the ACK message. Here, when the base station repeatedly receives the response request message for a predefined time T2, the base station considers the mobile station to be receiving the quasi-orthogonal channel at an insufficient power level, and accordingly, re-sets the power ratio by increasing the power of the quasi-orthogonal channel by a specified level.

4. Fourth Exemplary Method of the Third Embodiment

In a fourth exemplary method, the mobile station re-sets the power ratio according to the extent of an error generated during decoding the received quasi-orthogonal channel. In this method, it is assumed that the quasi-orthogonal channel for the forward link operates in a discontinuous transmission (DTX) mode and for this purpose, the mobile station includes a decider for deciding whether the channel signal exists or not. In the case where errors occur during decoding even though a quasi-orthogonal channel signal is received at a higher level than a predetermined level at a receiver of the mobile station, the mobile station notifies the base station to set a power ratio of the orthogonal channel to the quasi-orthogonal channel to be lower than the previously set power ratio, so as to increase the power of the quasi-orthogonal channel. Subsequently, the mobile station sends a power ratio change command to the base station via a reverse control channel, and the base station then transmits the orthogonal channel and the quasi-orthogonal channel at power levels corresponding to the re-set power ratio. If the quasi-orthogonal channel for the forward link does not operate in the DTX mode, the circuit for deciding existence of the frame is not required and the mobile station transmits a power-up command for the quasi-orthogonal channel via the reverse link when the quasi-orthogonal channel has the errors by simply determining whether the output of a decoder has the errors.

Figure 4:
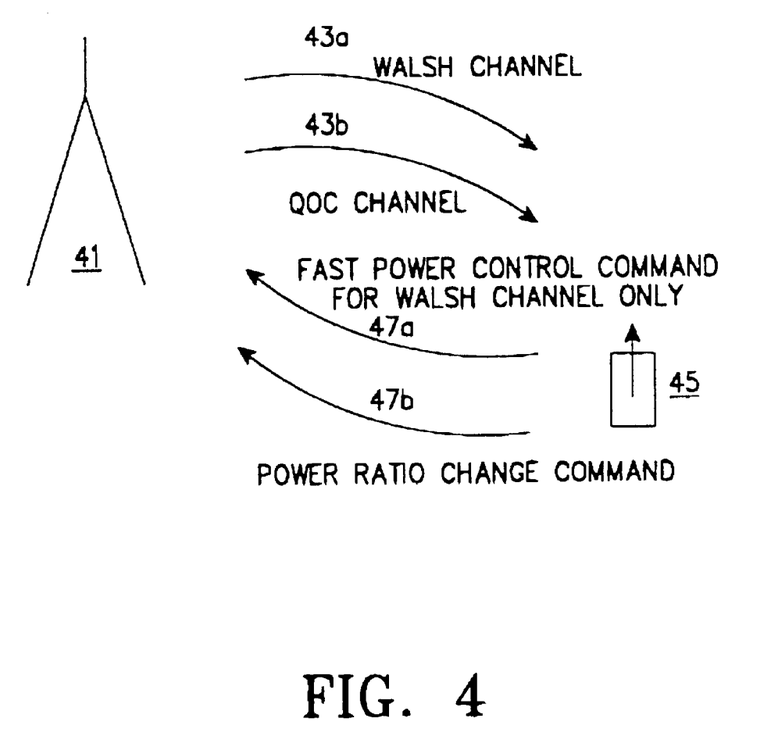
FIG. 4 is a diagram illustrating a method for simultaneously controlling powers of the channels using orthogonal and quasi-orthogonal codes with a single fast power control command and controlling a power ratio between the two channel according to a power ratio change command in a CDMA communication system according to the present invention.

FIG. 4 illustrates, by way of example, the method of the present invention for controlling the plurality of channel power for channels using the a combination of orthogonal and quasi-orthogonal codes for each channel with a single power control command. Referring to FIG. 4, a base station 41 controls the transmission powers of the orthogonal channel 43a and the quasi-orthogonal channel 43b according to a set power ratio and then transmits the power controlled channels to a mobile station 45. That is, the base station 41 transmits channel signals on the orthogonal channel 43a and the quasi-orthogonal channel 43b, the channel signals having a specific power ratio therebetween. The mobile station 45 then examines an SIR of the reference channel 43a despread with the orthogonal code (i.e., orthogonal channel) and quickly transmits a power control command for only the orthogonal channel 43a via a reverse link pilot channel as represented by reference numeral 47. The base station 41 then simultaneously controls or adjusts the powers of the orthogonal channel 43a and the quasi-orthogonal channel 43b in according with the set power ratio according to the received power control command. The base station then transmits the adjusted or power controlled channel signal. That is, the mobile station 45 requests the base station 41 to increase the transmission power of the orthogonal and quasi-orthogonal channels by transmitting a power control command for only the orthogonal channel 43a. The base station 41 responds by increasing the power of both the orthogonal channel 43a and the quasi-orthogonal channel 43b according to the set power ratio.

Since the power ratio between the orthogonal channel 43a and the quasi-orthogonal channel 43b, which is set in the base station 41, depends upon the channel environment, the mobile station 45 examines an SIR of the quasi-orthogonal channel 43b which is spread with the quasi-orthogonal code at a lower rate than the power control command and transmits a corresponding power ratio change message via a control channel. In FIG. 4, reference numeral 47 denotes a state where the power ratio change message (i.e., coded frame data) is transmitted to the base station 41 via the common channel. That is, the present invention solves the problem of requiring multiple power control commands when using a combination of orthogonal codes and quasi-orthogonal codes. By controlling the powers of each channel spread with the a combination of orthogonal and quasi-orthogonal codes using a single power control command, it is possible to prevent reduction in the capacity of the reverse link.

Fifth Embodiment

Figure 5:
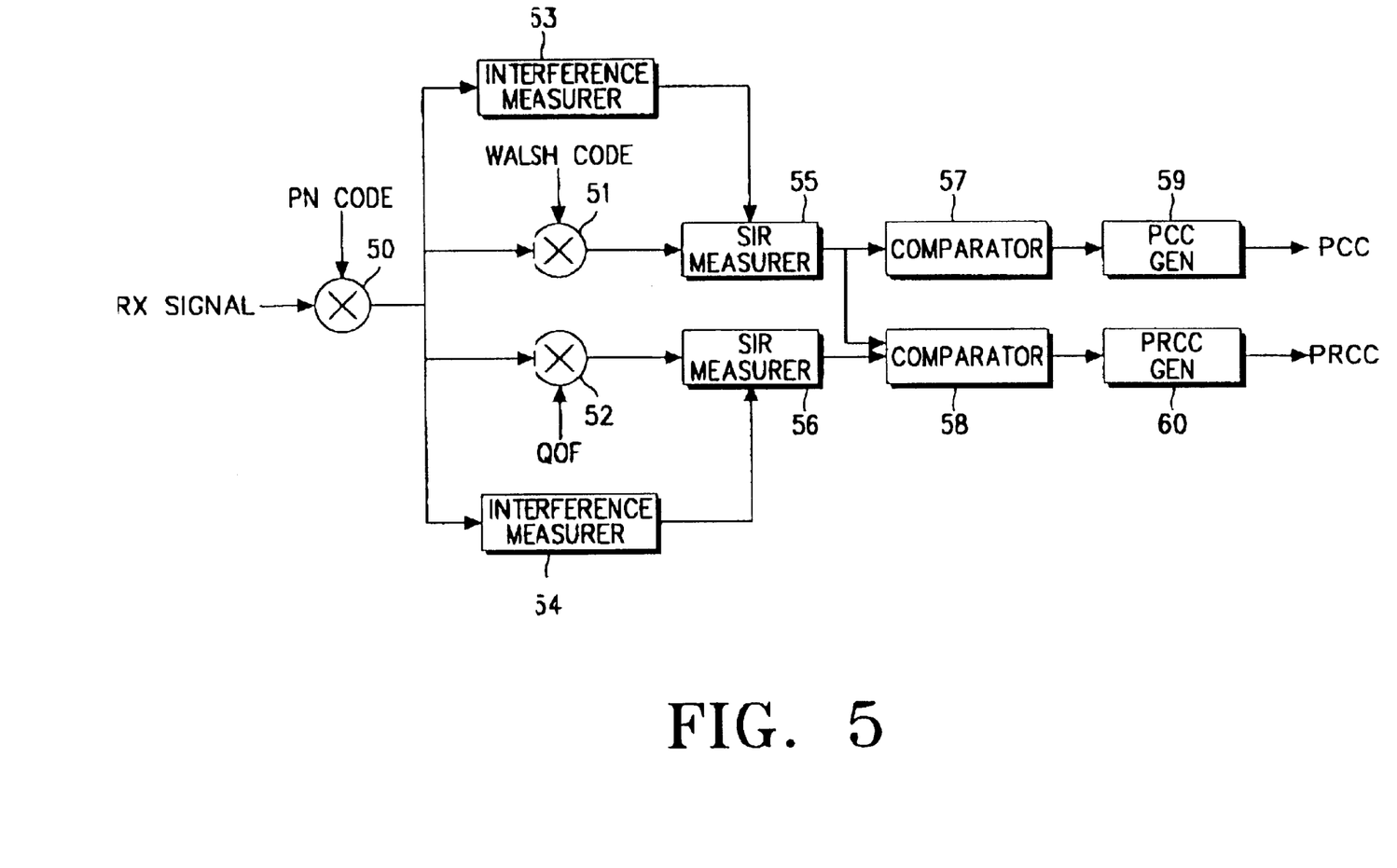
FIG. 5 is a block diagram illustrating a device for re-setting a transmission power ratio of the channels using orthogonal codes and quasi-orthogonal codes in a CDMA communication system according to an embodiment of the present invention.

FIG. 5 illustrates a device for re-setting a power ratio between the channels spread with a combination of orthogonal codes and quasi-orthogonal codes according to a third embodiment of the present invention. The figure shows that the mobiles station measures an SIR of the quasi-orthogonal channel and sends a corresponding power ratio change command (PRCC) to the base station.

Referring to FIG. 5, a multiplier 50 spreads a received signal by multiplying the received signal by a PN code. A multiplier 51 orthogonally despreads an output of the multiplier 50 by multiplying the output of the multiplier 50 by an orthogonal code. A corresponding multiplier 52 quasi-orthogonally despreads the output of the multiplier 50 by multiplying the output of the multiplier 50 by a quasi-orthogonal code. A first interference measurer 53 measures interference with respect to the orthogonal channel from an output signal of the multiplier 50. A second interference measurer 54 measures interference with respect to the quasi-orthogonal channel from the output signal of the multiplier 50. Here, the interference measurers 53 and 54 measure dispersion of a despread value of a forward link pilot channel or a non-assigned orthogonal channel or quasi-orthogonal channel, to calculate interference of the corresponding channels. A first SIR measurer (for the Walsh code) 55 calculates an SIR of the orthogonal channel by receiving the orthogonally despread signal and the interference for the orthogonal channel. A second SIR measurer (for the quasi-orthogonal code) 56 calculates an SIR of the quasi-orthogonal channel by using the quasi-orthogonal code despread signal and the interference measurer 54 output from the quasi-orthogonal channel. Here, the second SIR measurer 56 accumulates and averages the calculated SIR of the quasi-orthogonal channel for a specified time and provides the result to a second comparator 58. A first comparator 57 compares the measured SIR of the orthogonal channel with a first threshold value. The second comparator 58 receiving outputs of the first and second SIR measurers 55 and 56, compares the SIR of the quasi-orthogonal channel with a predefined second threshold value periodically (or non-periodically when necessary) or compares the SIR of the quasi-orthogonal channel with the SIR of the orthogonal channel, and outputs a difference value therebetween. A first power command (PCC) generator 59 quickly transmits one power control command bit using a power control group according to the comparison result output from the first comparator 57. A power ratio change command (PRCC) generator 60 receiving an output of the second comparator 58, adjusts the power ratio so that the orthogonal channel has the same SIR as that of the quasi-orthogonal channel, and sends the changed power ratio to the base station via the reverse link control channel. In addition, it is also possible to enable the base station to determine whether to change the power ratio, by the mobile station sending the SIRs of the respective channels to the base station via the reverse link channel.

In the fifth embodiment, the power of the orthogonal channel is quickly controlled through the first comparator 57 and the PCC generator 59, and the power of the quasi-orthogonal is controlled relatively slowly through the second comparator 58 and the PRCC generator 60. That is, the mobile station measures the SIR of the quasi-orthogonal channel more slowly than that of the orthogonal channel which is a reference channel. As a result of the measurement, when the measured SIR is lower than a threshold value, the mobile station sends the base station a power ratio re-set message so as to request an increase in the transmission power of the quasi-orthogonal channel. Upon reception of the power ratio re-set message, the base station increases the transmission power of the quasi-orthogonal channel according to the changed power ratio. Otherwise, when the measured SIR is much higher than the threshold value, the mobile station sends the base station a power ratio re-set message so as to request power-down of the quasi-orthogonal channel. Upon reception of the power ratio re-set message, the base station decreases the transmission power of the quasi-orthogonal channel according to the changed power ratio. That is, the mobile station sends the power ratio change command to base station via the control channel, and the base station then controls the transmission powers of the orthogonal channel and the quasi-orthogonal channel according to the re-set power ratio. Here, the fast power control command is transmitted using the power control group of FIG. 3. For another implementation quasi-orthogonal channel could be fast power control (uncoded power control bit transmission) and orthogonal channel would be low rate power control (i.e., message exchange).

Figure 6:
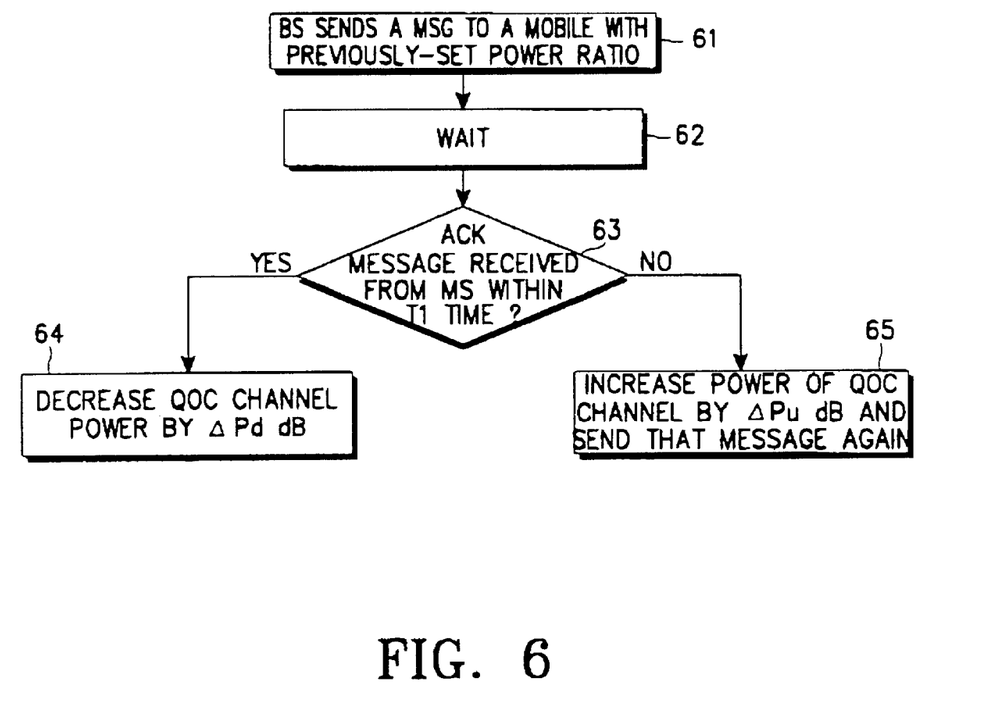
FIG. 6 is a flow chart illustrating a method for re-setting a transmission power ratio of the channels using orthogonal codes and quasi-orthogonal codes in a CDMA communication system according to an embodiment of the present invention.

FIG. 6 is a flowchart which illustrates a method for re-setting a power ratio between the channels spread with the a combination of orthogonal codes and quasi-orthogonal codes according to an embodiment of the present invention. In the flowchart, the base station sends a response request message to the mobile station via quasi-orthogonal channel and thereafter, controls the transmission power (i.e., re-sets the power ratio) of the quasi-orthogonal channel according to whether a response (or ACK) message is received from the mobile station in response to the transmitted quasi-orthogonal channel signal.

Referring to FIG. 6, in step 61, the base station transmits a quasi-orthogonal channel signal to the mobile station according to the set power ratio, and waits a predefined time T1 in step 62. After a lapse of the time T1, the base station determines in step 63 whether an ACK message is received from the mobile station to decide whether the mobile station has correctly received the channel signal. Upon receiving the ACK message from the mobile station within the time T1, the base station decreases the power of the quasi-orthogonal channel by a specified level ΔPd(dB) or maintains the present power, in step 64. However, upon failure to receive the ACK message within the time T1, the base station increases the transmission power of the quasi-orthogonal channel by the specified level ΔPd(dB), in step 65.

Figure 7:
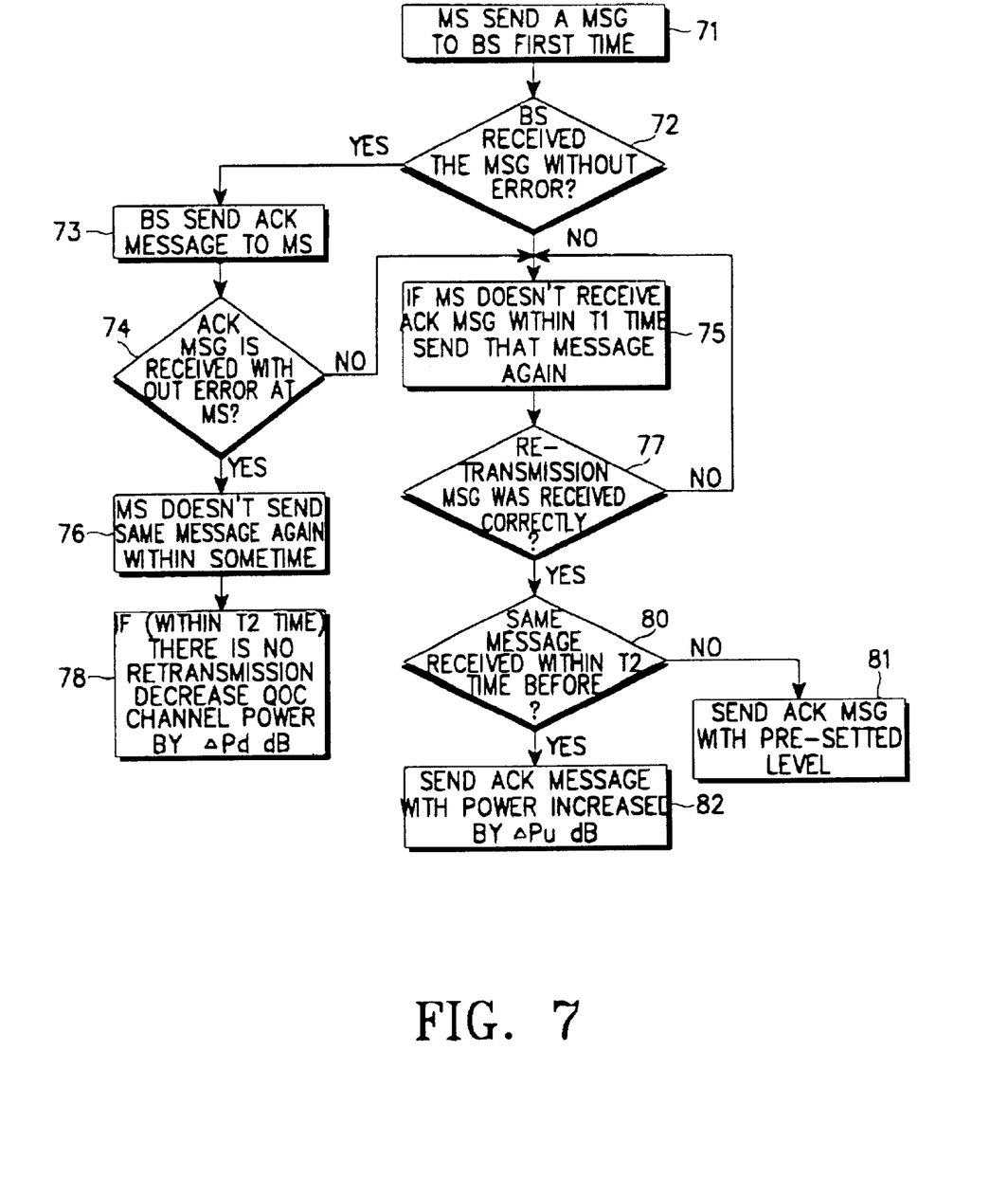
FIG. 7 is a flow chart illustrating a method for re-setting a transmission power ratio of the channels using orthogonal and quasi-orthogonal codes in a CDMA communication system according to another embodiment of the present invention.

FIG. 7 is a flowchart illustrating a method for re-setting a power ratio between the channels spread with the a combination of orthogonal codes and quasi-orthogonal codes according to another embodiment of the present invention. Unlike the embodiment shown in FIG. 6 where the base station re-set the power ratio, in the present embodiment the mobile station re-sets the power ratio by transmitting a response request message to the base station.

Referring to FIG. 7, in step 71, the mobile station sends a response (or ACK) request message to the base station to determine a condition of the quasi-orthogonal channel. In step 72, the base station then determines whether the message transmitted from the mobile station is received without an error. Here, when the received message has an error, i.e., when the base station does not receive the message transmitted from the mobile station, the base station cannot send the ACK message to the mobile station. Therefore, upon failure to receive the ACK message with the time T1, the mobile station re-sends the response request message to the base station in step 75. Otherwise, when the base station receives the message without an error, the base station sends an ACK message to the mobile station via the quasi-orthogonal channel, in step 73.

The mobile station then determines in step 74 whether the ACK message is received from the base station at a sufficient power level (i.e., without error) via the quasi-orthogonal channel. Upon failure to receive an error-free ACK message at the mobile station in step 74, the mobile station re-sends, in step 75, the response request message to the base station on the judgement that the base station has trouble receiving the message transmitted from the mobile station. However, upon reception of an error-free ACK message in step 74, the mobile station discontinues sending the response request message in step 76. That is, the mobile station stops sending the response request message to the base station, because the ACK message was correctly received from the base station via the quasi-orthogonal channel. Coincident with step 76, but not illustrated in the flowchart, the base station examines whether the same ACK message has been received in the previous T2 time interval. If the same ACK message has been received in consecutive T2 intervals, the base station re-sets, in step 78, the power ratio by decreasing the transmission power of the quasi-orthogonal channel by the specified level ΔPu(dB), on the judgement that the quasi-orthogonal channel is in an acceptable condition.

In the meantime, if the mobile station requests the base station to retransmit the ACK message in step 75, the base station determines in step 77 whether the retransmitted ACK message is correctly received. When the ACK message is not correctly received, the procedure returns to step 75 in which the mobile station re-sends the response request message to the base station. However, upon correct reception of the retransmitted ACK message in step 77, the base station determines in step 80 whether the same ACK message has been repeatedly received in the time interval T2. Here, when the same ACK message has not been previously received in step 80, the base station, in step 81, sends the ACK message at the pre-set power level to the mobile station via the quasi-orthogonal channel, on the judgement that the received response request message is received from the mobile station for the first time. However, when the same ACK message has been repeatedly received within the time T2 in step 80, the base station sends in step 82 the ACK message to the mobile station after increasing the power of the quasi-orthogonal channel by the specified level ΔPu(dB).

That is, in this exemplary embodiment, the mobile station first sends the response request message to the base station, and the base station then sends the ACK message via the quasi-orthogonal channel in response to the received message. Here, if the quasi-orthogonal channel is error prone, the mobile station cannot properly receive the ACK message and thus the mobile station retransmits the response request message to the base station. Otherwise, when the quasi-orthogonal channel is error-free, the mobile station stops sending the response request message upon reception of an ACK message from the base station within a specified time. From the base station's perspective, upon reception of the response request message from the mobile station, the base station examines whether the same response request message has been previously received in the most recent reception time interval. When the same response request message has been repeatedly received, the power ratio is re-set by the base station by increasing the power of the quasi-orthogonal channel in consideration of the fact that the quasi-orthogonal channel is in bad condition. Otherwise, when the same response request message is not repeatedly received by the base station, the power ratio is re-set by maintaining or decreasing the power of the quasi-orthogonal channel in consideration of the fact the orthogonal channel is presumed to be in a good condition.

Figure 8:
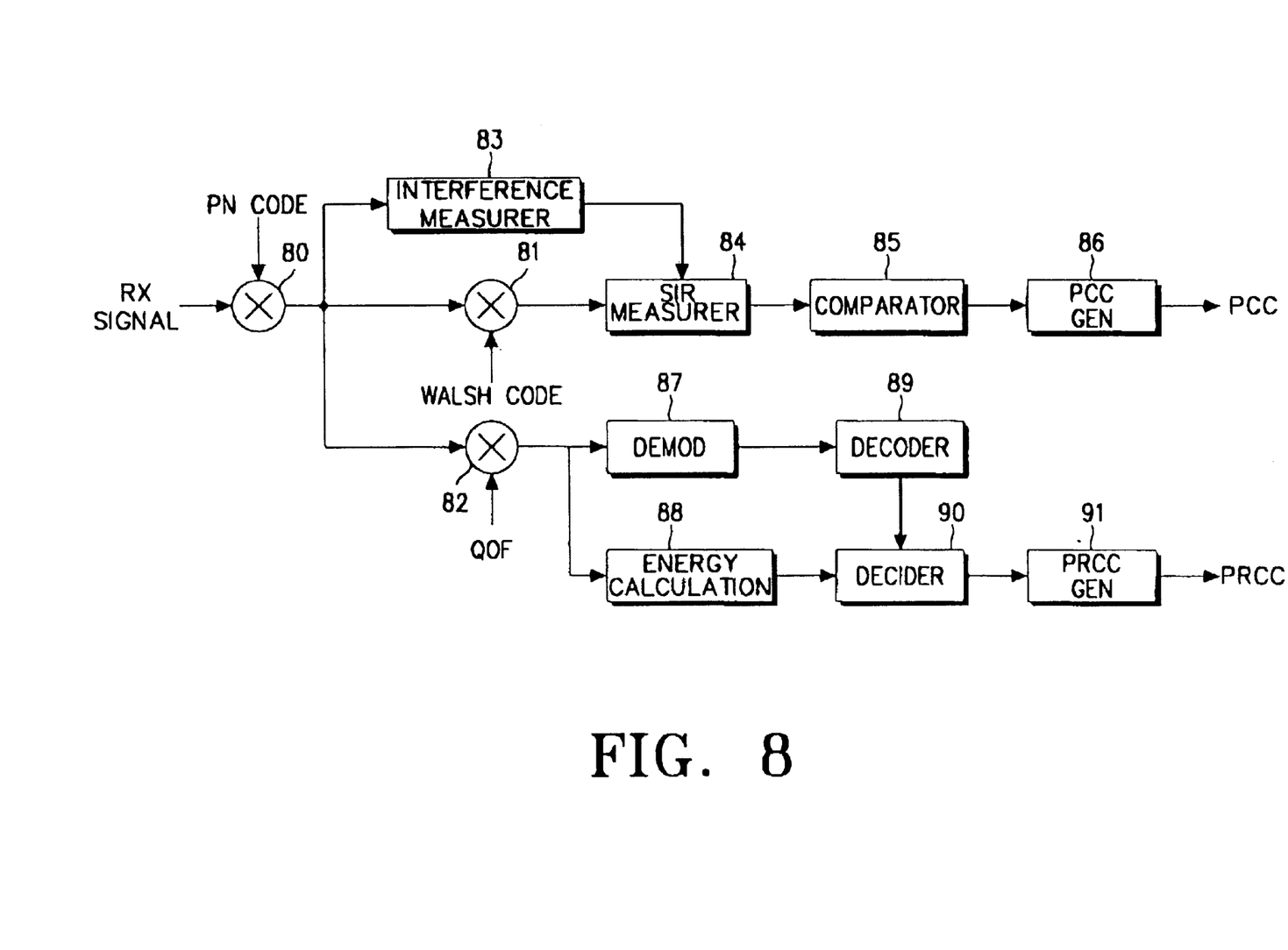
FIG. 8 is a diagram illustrating a device for re-setting a transmission power ratio of the channels using orthogonal codes and quasi-orthogonal codes in a CDMA communication system according to another embodiment of the present invention.

FIG. 8 illustrates a device for re-setting a power ratio between the channels using the a combination of orthogonal codes and quasi-orthogonal codes according to another embodiment of the present invention. In the illustrated block diagram, the mobile station generates a power control command according to the extent of errors generated during decoding the quasi-orthogonal channel.

Referring to FIG. 8, a multiplier 80 despreads a received signal by multiplying the received signal by a PN code. A multiplier 81 orthogonally despreads an output signal of the multiplier 80 by multiplying the output signal of the multiplier 80 by the orthogonal code. A multiplier 82 orthogonally despreads the output signal of the multiplier 80 by the quasi-orthogonal code. An interference measurer 83 measures interference for the orthogonal channel from the output signal of the multiplier 80. Here, the interference measure 83 measure dispersion of the despread value of the forward link pilot channel or the non-assigned orthogonal channel, to calculate the interference of the corresponding channels. An SIR measurer 84 calculates the SIR of the corresponding orthogonal channel by receiving the orthogonally despread signal and the measured interference of the orthogonal channel. A comparator 85 compares the measured SIR of the orthogonal channel with a threshold value. A power control command (PCC) generator 86 quickly transmits one power control command according to the comparison result output from the comparator 85 by loading it on the power control group. A demodulator 87 performs synchronous demodulation by multiplying the signal spread with the quasi-orthogonal code by a conjugate complex signal obtained by channel estimation. An energy calculator 88 calculates an energy of the despread quasi-orthogonal channel by the frame unit, and uses the calculated value in determining whether or not a message has been transmitted via the quasi-orthogonal channel. A decoder 89 decodes an output of the demodulator 87 by the frame unit. A decider 90 decides whether the signal is received, according to the calculation result of the energy calculator 88. Also, the decider 90 decides the degree of errors of the quasi-orthogonal channel based on the decoding result of the decoder 89. A power ratio change command (PRCC) generator 91 re-sets the power ratio according to an output of the decider 90 and sends the changed power ratio to the base station via the control channel.

In the embodiment shown in FIG. 8, the input signal to the mobile station is despread with the spreading code identical to that used for the forward link. The despread signal is despread with the orthogonal code and the quasi-orthogonal code, respectively. The SIR measurer 84 calculates the SIR of the orthogonal channel depending on the orthogonally despread signal and the measured interference of the orthogonal channel. The comparator 85 compares the measured SIR of the orthogonal channel with the threshold value. The power control command generator 86 quickly transmits one power control command according to the comparison result output from the comparator 85 by loading it on the power control group. In the meantime, the signal despread with the quasi-orthogonal code is applied to the demodulator 87 and the energy calculator 88, respectively. The energy calculator 88 calculates the energy of the despread quasi-orthogonal channel by the frame unit and outputs the calculated value to the decider 90. Further, the signal demodulated by the demodulator 87 is decoded in the decoder 89 and the decoded signal is also applied to the decider 90. The decider 90 then decides the extent of the error of the quasi-orthogonal channel based on the decoding result in the frame unit. Thereafter, the power ratio change command generator 91 transmits a message for controlling the power of the quasi-orthogonal channel to the base station via the control channel according to the error decision result. Here, in the case where an error occurs during decoding at the receiver of the mobile station even though it is possible to receive the signal on the quasi-orthogonal channel because its level is equal to or slightly higher than the threshold value, the mobile station re-sets the power ratio to increase the power of the quasi-orthogonal channel and then, sends the corresponding power ratio control command to the base station via the control channel.

In the light of the forgoing descriptions, the novel channel transmission device using a combination of orthogonal codes and quasi-orthogonal codes provides an efficient control method, in the case where the quasi-orthogonal codes are used due to a lack of available orthogonal codes.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A base station device for a code division multiple access (CDMA) communication system, comprising:
   a first channel generator for generating a first channel signal by spreading first input data with an orthogonal code;
   a second channel generator for generating a second channel signal by spreading second input data with a quasi-orthogonal code, said second channel signal having a gain higher than that of the first channel signal;
   a first gain controller for controlling power of the first channel signal;
   a second gain controller for controlling power of the second channel signal;
   an adder for adding the first channel signal to the second channel signal; and
   a spreader for spreading a signal output from the adder with a pseudo-random noise (PN) code.

2. The base station device as claimed in claim 1, wherein each of the channel generators comprises:
   a channel encoder for encoding the input data;
   an interleaver for interleaving an output of the channel encoder; and
   a multiplier for multiplying an output of the interleaver by a corresponding spreading code.

3. The base station device as claimed in claim 1, further comprising a controller for controlling powers of the first and second gain controllers.

4. The base station device as claimed in claim 3, wherein the controller controls the power of the first channel in response to a power control command for the first channel received from a mobile station, and controls the power of the second channel in response to a power control command for the second channel received from the mobile station.

5. The base station device as claimed in claim 3, wherein the controller sets a power ratio between the first channel spread with the orthogonal code and the second channel spread with the quasi-orthogonal code according to a power ratio change command received from a mobile station.

6. The base station device as claimed in claim 3, wherein transmission powers of the first and second channels are controlled according to a fast power control command for the first channel and a power ratio change command message received from a mobile station.

7. The base station device as claimed in claim 6, wherein the power ratio change command is varied according to a signal-to-interference ratio (SIR) for the second channel in the mobile station.

8. The base station device as claimed in claim 6, wherein the power ratio change command is generated according to a signal-to-interference (SIR) ratio between the first channel spread with the orthogonal code and the second channel spread with the quasi-orthogonal code.

9. The base station device as claimed in claim 6, wherein the power ratio is re-set by controlling the power of the second channel spread with the quasi-orthogonal code.

10. The base station device as claimed in claim 6, wherein the power ratio change command is transmitted via a reverse link control channel.

11. The base station device as claimed in claim 6, wherein a time required for accumulating an SIR of the second channel is longer than a time required for accumulating an SIR of the first channel, at the mobile station.

12. The base station device as claimed in claim 1, wherein the base station transmits a response request message to a mobile station via the second channel, to retransmit the response request message after increasing a transmission power of the second channel when a response message is not received from the mobile station.

13. The base station device as claimed in claim 1, wherein the base station sends a response message at a pre-set power level via the second channel, upon receiving a response request message from a mobile station.

14. A mobile station device for a CDMA communication system, comprising:
a first controller for generating a power control command by averaging an SIR of a first channel signal despread with an orthogonal code for a first time and comparing the averaged SIR with a threshold value;
a second measurer for averaging an SIR of a second channel despread with a quasi-orthogonal code for a second time longer than the first time; and
a message generator for generating a power ratio change command responsive to the SIR of the first channel signal and the SIR of the second channel.

15. The mobile station device as claimed in claim 14, wherein the first controller comprises:
a first measurer for measuring the SIR of the first channel signal;
a first comparator for comparing the measured SIR with a threshold value; and
a power control command generator for generating the power control command according to an output of the first comparator.

16. The mobile station device as claimed in claim 14, wherein the message generator comprises:
a second comparator for comparing the SIR of the second channel signal with first and second threshold values; and
a power ratio change command generator for generating the power ratio change command for decreasing a transmission power of the second channel signal when the SIR is higher than the first threshold value and increasing the transmission power of the second channel signal when the SIR is lower than the second threshold value.

17. The mobile station device as claimed in claim 14, wherein the message generator compares the SIR of the first channel signal with the SIR of the second channel signal and generates the power ratio change command for controlling a power ratio between the first and second channel signals according to the comparison result.

18. The mobile station device as claimed in claim 14, wherein the mobile station sends a response request message to a base-station and the base station then sends a response message via the second channel upon receiving the response request message.

19. The mobile station device as claimed in claim 18, wherein the base station determines whether the same response request message has been received repeatedly within a predefined time, and increases the transmission power of the second channel when the same response request message has been received repeatedly.

20. The mobile station device as claimed in claim 14, further comprising a decoder for decoding the second channel signal.

21. The mobile station device as claimed in claim 20, wherein the power ratio change command is generated according to errors generated during decoding at the decoder.

22. The mobile station device as claimed in claim 14, wherein the first channel despread with the orthogonal code is a fundamental channel and the second channel despread with the quasi-orthogonal code is a dedicated control channel.

23. A power control method in a base station for a CDMA communication system, comprising:
generating a first channel signal by spreading first input data with an orthogonal code;
generating a second channel signal by spreading second input data with a quasi-orthogonal code;
controlling power of the first channel signal;
controlling power of the second channel signal, said second channel signal having a gain higher than that of the first channel signal;
adding the first channel signal to the second channel signal; and
spreading the added signal with a PN code.

24. The power control method in a base station device as claimed in claim 23, wherein each of the first and second channel generation steps comprises the steps of:
encoding the input data;
interleaving the encoded data; and
multiplying the interleaved data by a corresponding spreading code.

25. The power control method in a base station device as claimed in claim 24, wherein the power control steps control power of the first channel in response to a power control command for the first channel received from a mobile station, and control power of the second channel in response to a power control command for the second channel received from the mobile station.

26. The power control method in a base station device as claimed in claim 24, wherein the power control steps set a power ratio between the first and second channels according to a power ratio change command received from a mobile station.

27. The power control method in a base station device as claimed in claim 24, wherein transmission powers of the first and second channels are controlled according to a fast power control command for the first channel and a power ratio change command, received from a mobile station.

28. The power control method in a base station device as claimed in claim 27, wherein the power ratio change command is varied according to a signal-to-interference ratio (SIR) for the second channel in the mobile station.

29. The power control method in a base station device as claimed in claim 28, wherein the power ratio change command is generated according to a signal-to-interference ratio (SIR) between the first channel spread with the orthogonal code and the second channel spread with the quasi-orthogonal code.

30. The power control method in a base station device as claimed in claim 28, wherein the power ratio is re-set by controlling the power of the second channel spread with the quasi-orthogonal code.

31. The power control method in a base station device as claimed in claim 28, wherein the power ratio change command is transmitted via a reverse link control channel.

32. The power control method in a base station device as claimed in claim 28, wherein a time required for accumulating an SIR of the second channel is longer than a time required for accumulating an SIR of the first channel, at the mobile station.

33. The power control method in a base station device as claimed in claim 23, wherein the base station transmits a response request message to a mobile station via the second channel, to retransmit the response request message after increasing a transmission power of the second channel when a response message is not received from the mobile station.

34. The power control method in a base station device as claimed in claim 23, wherein the base station sends a response message at a pre-set power level via the second channel, upon receiving a response request message from a mobile station.

35. A power control method in a mobile station device for a CDMA communication system, comprising:

generating a power control command by averaging an SIR of a first channel signal despread with an orthogonal code for a first time and comparing the averaged SIR with a threshold value;

averaging an SIR of a second channel despread with a quasi-orthogonal code for a second time longer than the first time; and generating a power ratio change command being set such that the SIR of the first channel signal is identical to the SIR of the second channel.

36. The power control method in a mobile station device as claimed in claim 35, wherein the power control command generation step comprises the steps of:

measuring the SIR of the first channel signal;

comparing the measured SIR with a threshold value; and generating a power control message responsive to said SIR of a first channel and second channel.

37. The power control method in a mobile station device as claimed in claim 35, wherein the power control message generation step comprises the steps of:

comparing the SIR of the second channel signal with first and second threshold values; and generating the power ratio change command for decreasing a transmission power of the second channel signal when the SIR is higher than the first threshold value and increasing the transmission power of the second channel signal when the SIR is lower than the second threshold value.

38. The power control method in a mobile station device as claimed in claim 35, wherein the power control message generation step compares the SIR of the first channel signal with the SIR of the second channel signal and generates the power ratio change command for controlling a power ratio between the first and second channel signals according to the comparison result.

39. The power control method in a mobile station device as claimed in claim 35, wherein the mobile station sends a response request message to a base station via a reverse control channel and the base station then sends a response message via the second channel upon receiving the response request message.

40. The power control method in a mobile station device as claimed in claim 39, wherein the base station determines whether the same response request message has been received repeatedly within a predefined time, and increases the transmission power of the second channel.

41. The power control method in a mobile station device as claimed in claim 35, further comprising the step of decoding the second channel signal.

42. The power control method in a mobile station device as claimed in claim 41, wherein the power ratio change command is generated according to errors generated during decoding at the decoder.

43. The power control method in a mobile station device as claimed in claim 35, wherein the first channel despread with the orthogonal code is a supplemental channel and the second channel despread with the quasi-orthogonal code is a dedicated control channel.

* * * * *